United States Patent
Qiao et al.

(10) Patent No.: US 10,493,507 B1
(45) Date of Patent: Dec. 3, 2019

(54) METHOD OF RENOVATING AND AFFORESTING SLAG MOUNTAIN WITH HUMIC ACID SUBSTANCE

(71) Applicant: China University of Petroleum (East China), Qingdao (CN)

(72) Inventors: Yingyun Qiao, Qingdao (CN); Yuanyu Tian, Qingdao (CN); Kechang Xie, Qingdao (CN); Zhaohe Yang, Qingdao (CN); Zhimei Zhang, Qingdao (CN); Xue Ming, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 16/293,182

(22) Filed: Mar. 5, 2019

(30) Foreign Application Priority Data

Dec. 10, 2018 (CN) .......................... 2018 1 1503932

(51) Int. Cl.
| | |
|---|---|
| *C21B 3/06* | (2006.01) |
| *B09B 1/00* | (2006.01) |
| *C21C 7/04* | (2006.01) |
| *B09C 1/08* | (2006.01) |
| *C05F 11/08* | (2006.01) |
| *B02C 4/28* | (2006.01) |
| *B02C 15/00* | (2006.01) |

(52) U.S. Cl.
CPC ................ *B09B 1/004* (2013.01); *B09C 1/08* (2013.01); *C21B 3/06* (2013.01); *C21C 7/04* (2013.01); *B02C 4/28* (2013.01); *B02C 15/00* (2013.01); *C05F 11/08* (2013.01); *C21B 2400/02* (2018.08)

(58) Field of Classification Search
CPC ....... C04B 18/141; C05D 9/00; Y10S 71/903; Y10S 71/904; C05G 24/00; B09C 1/08; A01B 79/02
See application file for complete search history.

(56) References Cited

FOREIGN PATENT DOCUMENTS

| DE | 3231473 A1 * | 3/1984 | ............. A01B 79/02 |
|---|---|---|---|
| JP | S58143013 A * | 8/1983 | ............... E02D 3/12 |

OTHER PUBLICATIONS

Cărăbiş, Augustina Delia, et al. "Recultivation of slag heaps by fertilization with organic fertilizers." Agronomy Series of Scientific Research/Lucrari Stiintifice Seria Agronomie 56.2 (2013).*

Guo, Jianlong, Yanping Bao, and Min Wang. "Steel slag in China: Treatment, recycling, and management." Waste management 78 (2018):318-330.*

* cited by examiner

*Primary Examiner* — Jennifer A Smith

(74) *Attorney, Agent, or Firm* — Volpe and Koenig, P.C.

(57) ABSTRACT

A method utilizing a humic acid substance for renovating and afforsesting slag is provided. A humic acid substance may be utilized for passivation, adsorption, reduction, chelation and immobilization of harmful heavy metal elements in slag, for example, Cr, As, Cd, Ni, Pb, Ba, Hg, Co, Se, Ag and Be, and aggregating the slag, thereby detoxifying the slag and producing artificial earth. The artificial earth may be used in combination with a carrier bacterial fertilizer to continuously produce the active humic acid substance, achieving an effect similar to the combination of blood transfusion and blood production, thereby forming a high-quality artificial soil.

14 Claims, No Drawings

METHOD OF RENOVATING AND AFFORESTING SLAG MOUNTAIN WITH HUMIC ACID SUBSTANCE

CROSS REFERENCE TO RELATED APPLICATIONS

This application claims priority to Chinese Application No. 201811503932.2, filed on Dec. 10, 2018, entitled "Method of Renovating and Afforesting Slag Mountain with Humic Acid", which is specifically and entirely incorporated by reference.

FIELD OF THE INVENTION

The invention relates to the treatment of slag mountain, especially relates to the technical field of management, afforestation and treatment of coal gangue mountain, and particularly relates to a method of renovating and afforesting slag mountain with humic acid substance.

BACKGROUND OF THE INVENTION

The discharged amount of selected gangue, coal lane gangue, rock lane gangue, hand-selected gangue of the coal mines and coal preparation plants as well as tailings of the coal preparation plants account for about 10-20% of total coal production. The production of gangue will increase along with the development of coal mining technology. At present, the annual discharged amount of gangue in China is more than 100 million tons, but its comprehensive utilization rate is less than 20%. 1.477 billion tons of gangue has been piled up to form a great number of gangue mountains covering an area of 13,300 hectares, the environment of mining areas are polluted by the spontaneous combustion, eruption and explosion, landslide, and leaching water of the gangue mountains. It is an effective method to prevent spontaneous combustion by paving soil on surface of the gangue mountain, compacting the soil and insulating the air path, such that the air inside the gangue mountain is exhausted and the fire is extinguished. The surface sealing and compaction method can be used for reducing the burning intensity and emission rate of pollutants, it is mainly used for controlling the fire behavior and pollution intensity of the gangue mountains, but it requires a timely maintenance. The method used in China with respect to stratified stacking gangue and compacting gangue with soil has achieved the desirable effects in preventing spontaneous combustion of the gangue mountain. However, the current practice of renovating and treating the gangue mountains by means of commercially available soil has many disadvantages, such as the transportation cost is high, the excavation of high-quality soil suffers from high cost and significant difficulty, in addition, the afforestation and reclamation effect are poor, and the water and soil erosion is serious. In addition, the washing of rain water on the fine gangue particles will form a large amount of silt, which pollute the water body; the sulfur in the gangue will be oxidized and react with the leaching water to form acid, which dissolve other toxic and harmful elements in the gangue, further pollutes the surrounding soil and water body; the discharged acidic water and dissolved ferric ions and other metal ions may cause suffocation of the organism, hardening of the river water, reducing the breeding areas of animals and plants and polluting the water source, thereby bring about grave consequences.

For example, Shenhua Ningxia Coal Industry Group Company in Northwest China consumes about 37 million tons of coal annually, and has by-product gasification slag and ash residue of about 4.8 million tons (dry slag). However, a large amount of stockpiled gasification furnace slag has to be buried and disposed by paying high expense resulting from the underdeveloped economy and the small scale of infrastructure in Ningxia Hui Autonomous Region, the used amount of building materials in the region is small, long-distance transportation is not cost-effective. On the one hand, the environmental protection benefits are poor, the coal group is required to pay a huge landfill fee of about 230 million yuan, it imposes a heavy burden on the enterprise; on the other hand, the rain leaching and filtrating (leaching, dissolving and infiltration) results in that the harmful elements in the slag are dissolved, when the harmful elements are infiltrate into the soil and absorbed by plants, it may contaminate surface water and underground water, thereby threat human health. Therefore, it is urgent to carry out research on the comprehensive utilization technology of gasifier slag and ash, solve the difficult problem of large-scale resource utilization of gasifier slag and ash, it is critical for the Shenhua Ningxia Coal Industry Group Company to gain both the environmental and economic benefits. The comprehensive utilization of gasification ash and slag, which make up a large share of solid wastes, is an important factor in achieving circular economy in the entire coal chemical project.

The process of mining and sorting other mineral resources also produce a large amount of waste residues, which are directly stockpiled in the dumping site or tailings pond, resulting in that a large quantities of land resources are occupied and the land resources cannot be effectively utilized. At the same time, the exposure of uncovered slag and tailings sediment causes the flying dust, which brings about significant inconvenience on the production of mines and the daily life of the nearby residents, resulting in a decline in the quality of the living environment. Moreover, when the slag is piled up in the dumping site, its front edge presents a high and steep slope, which is prone to be unstable when encountering with heavy rain, it will cause geological disasters such as collapse and landslide, and provide a material source for a formation of debris flow. In addition, the rain eluent also produces pollution of the heavy metal ions.

SUMMARY OF THE INVENTION

The purpose of the invention is to overcome the disadvantages of the existing treatment, afforestation and reclamation technology for slag mountain, and provide a method of renovating and afforesting slag mountain with humic acid substance. The invention utilizes humic acid substance for passivation, adsorption, reduction, chelation and immobilization of harmful heavy metal elements in the slag, such as Cr, As, Cd, Ni, Pb, Ba, Hg, Co, Se, Ag and Be, and aggregating the slag, thereby detoxifying the slag and produce artificial earth; and the artificial earth is used in combination with a carrier bacterial fertilizer to continuously produce the active humic acid substance, achieving an effect of combination of blood transfusion and blood production, thereby forming a high-quality artificial soil; performing stratified covering the slag mountain according to the different characteristic, compacting the soil layer to prevent spontaneous combustion, ensuring a plough layer of the artificial soil permanent reduction, complexation and immobilization of the heavy metal ions, conserve soil moisture, conserve moisture and fertilizer, thereby improve the survival rate and growth rate of reforested and reclaimed plants, and effectively prevent water and soil loss and landslide.

In order to fulfil the above purpose, the present invention provides a method of renovating and afforesting slag mountain with humic acid substance, comprising:

1) adding 0.1-5 wt. % of humic acid substance corresponding the slag during pulverization of slag, to prepare an artificial earth having a particle diameter less than 0.5 mm;

2) adding a carrier bacterial fertilizer into the artificial earth according to a mixing ratio 1:20-300 by weight of the carrier bacterial fertilizer to the artificial earth to prepare an artificial soil, wherein the carrier bacterial fertilizer is semi-coke bacterial fertilizer or slag bacterial fertilizer;

3) covering the surface of the slag mountain with the artificial earth to form an artificial earth layer with a thickness of 100-2,000 mm and compacting the artificial earth layer, and then covering the artificial earth layer with the artificial soil to form an artificial soil layer having a thickness of 100-300 mm, subsequently afforesting the slag mountain.

Preferably, the humic acid substance is one or more of humic acid, potassium humate, sodium humate and biomass pyrolysis oil.

Preferably, the slag is pulverized with a pulverizer, the pulverizer is one of ball mill, cone crusher, toothed roller crusher, baffle crusher, impact crusher, hammer crusher, rotary crusher, and composite crusher, hydraulic crusher, deep cavity crusher, roll crusher, Symons cone crusher, hydraulic cone crusher and jaw crusher.

Preferably, wherein the semi-coke bacterial fertilizer or the slag fertilizer is obtained by uniformly loading 3-20% by weight of the microbial bacterial fertilizer corresponding to biological semi-coke powder or gasifier slag on the biological semi-coke powder or the gasifier slag, and drying;

wherein the microbial fertilizer comprises microbial thallus or microbial metabolites, the microbial thallus is at least one of *Bacillus, Saccharomyces cerevisiae, Aspergillus oryzae, Rhizobium*, Azotobacteria and Phosphorus bacteria; the metabolite is an active enzyme, which is one or more of a protease and a plant kinase.

Preferably, the loading method comprising: mixing microbial bacterial fertilizer solution and the biological semi-coke powder or the gasifier slag uniformly, to allow the microbial bacterial fertilizer loading on the biological semi-coke powder or the gasifier slag.

Preferably, obtaining the biological semi-coke powder by rapidly pyrolyzing agricultural and forest residues to prepare biological semi-coke, then pulverizing the biological semi-coke into the biological semi-coke powder which has a particle diameter of 0.01-5 mm; wherein the rapidly pyrolyzing method includes: pyrolyzing the agricultural and forest residues in reaction conditions of absence of air at 490-600° C. for 0.1-20 s, thereby prepare the biomass pyrolysis oil and semi-coke.

Preferably, the gasifier slag is a porous pozzolan fine particle formed by chilling a melt cinder generated when gasifying pulverized coal in an airflow bed at a temperature of 1,300° C. or more.

Preferably, prior to uniformly loading the microbial bacterial fertilizer on the biological semi-coke powder or the gasifier slag, the method further comprising: uniformly mixing 0.1-2 parts by weight of humectant with 100 parts by weight of the biological semi-coke powder or the gasifier slag, so as to prepare an modified biological semi-coke powder or an modified gasifier slag; wherein the humectant is an anionic surfactant, a nonionic surfactant, and a silanol nonionic surfactant, and a solvent which has a small surface tension and is miscible with water; the solvent which has a small surface tension and is miscible with water includes one or more selected from the group consisting of ethanol, propylene glycol, glycerin and dimethyl sulfoxide.

According to a preferred embodiment of the invention, in the first step, while the slag is added into the cone crusher for pulverization, 0.1-5 wt. % of the sodium humate corresponding to slag and a small amount of water are added, then pulverizing to prepare artificial earth particles having a particle diameter less than 0.5 mm. The method can eliminate dust, and uses sodium humate substance to perform in situ reduction, passivation and immobilization of heavy metals. In addition, while the slag is pulverized, the mixing of the pulverized slag and the sodium humate substance may be intensified, and a water-stable aggregate having a particle diameter more than 0.25 mm may be formed. The heavy metal can sufficiently contact with the sodium humate substance at the fresh interface generated by the pulverization, thereby strengthen the in situ reduction and the complexation and immobilization reaction.

According to a preferred embodiment of the invention, in the second step, the semi-coke bacterial fertilizer and the above-mentioned artificial earth particles are uniformly mixed based on a weight ratio of 1:20-300, the semi-coke bacterial fertilizer continuously produces active humic acid substance, achieves an effect of combination of blood transfusion and blood production and ensures that the ratio of water stable aggregate is not reduced, thereby forms a high-quality artificial soil.

According to a preferred embodiment of the invention, in the third step, initially covering the surface of the slag mountain with the artificial earth particles to form an artificial earth particles layer with a thickness of 100-2,000 mm, and compacting artificial earth particles layer to insulate air and prevent spontaneous combustion; then covering with the artificial soil to form a high quality artificial soil layer with a thickness of 100-300 mm, ensuring the plough layer permanent reduction, complexation and immobilization of the heavy metal ions, conserve soil moisture, conserve moisture and fertilizer; then planting flowers, grass and trees, and improving the survival rate and growth rate of afforestation and reclamation, thereby effectively prevent the water and soil loss and landslide, and elaborately maintain the plants to form a green cover. Performing stratified covering of the slag mountain according to the different characteristic may reduce the costs of treatment, afforestation and reclamation and ensures the desirable effect of treatment.

The methods are implemented and tested according to the above scheme, it is demonstrated that the method of renovating and afforesting slag mountain with humic acid substance is reasonable, the operation is simple and safe, the production cost is low, the method can be used for performing in situ reduction, complexation and immobilization, and permanent encapsulation and blocking of heavy metals in the slag mountain, eradicating the secondary pollution and rebound of the treatment, preventing spontaneous combustion, water and soil loss and landslides, increasing survival rate of the green cover, promoting growth of green plants, improving the natural environment with rapid renovation and desirable effects. The renovated soil can normally grow trees and flowers and plant a variety of crops, the treated soil exhibits desirable gas permeability, and property of conserving soil moisture and fertilizer, the treatment cost is low, and the method may be applied in a wide range and produce improved economic and social benefits, thereby fulfill the predetermined purpose desirably.

DETAILED DESCRIPTION OF THE EMBODIMENTS

The features of invention will be described in detail with reference to the examples.

The semi-coke bacterial fertilizer is obtained by preparing the silanol nonionic surfactant GSK-588 corresponding to 0.5 wt. % of the biological semi-coke powder into the 2 wt. % aqueous solution, mixing the aqueous solution with the biological semi-coke powder uniformly so as to prepare a modified biological semi-coke powder, then the microbial bacterial fertilizer is uniformly loaded on the modified biological semi-coke powder, and performing a low-temperature drying under a temperature less than 45° C.; wherein the microbial bacterial fertilizer is a microbial bacterial fertilizer solution containing *Bacillus, Rhizobium*, Azotobacteria and Phosphorus bacteria corresponding to 10 wt. % of the biological semi-coke powder. The biomass pyrolysis oil and biological semi-coke are obtained by pyrolysis reaction of corn stalk in a condition of absence of air and a temperature of 550° C. for 10 seconds, wherein the biological semi-coke is pulverized into the powder having a particle size of 0.01-5 mm to prepare the biological semi-coke powder, which is used for preparing the semi-coke bacterial fertilizer.

The slag bacterial fertilizer is obtained by preparing the silanol nonionic surfactant GSK-588 corresponding to 0.5 wt. % of the gasifier slag into the 2 wt. % aqueous solution, mixing the aqueous solution with the gasifier slag uniformly, then the microbial bacterial fertilizer is uniformly loaded on the gasifier slag, and performing a low-temperature drying under a temperature less than 45° C.; wherein the microbial bacterial fertilizer is a microbial bacterial fertilizer solution containing *Bacillus, Rhizobium*, Azotobacteria and Phosphorus bacteria corresponding to 10 wt. % of the biological semi-coke powder.

Example 1

In the first step, while the slag is added into the cone crusher for pulverization, 3 wt. % of sodium humate corresponding to the slag and a small amount of water are added, then pulverizing to obtain artificial earth particles having a particle diameter less than 0.5 mm. In addition, while the slag is pulverized, the mixing of the pulverized slag and the sodium humate is intensified so as to form a water-stable granular structure having a particle diameter more than 0.25 mm.

In the second step, the semi-coke bacterial fertilizer and the above-mentioned artificial earth particles are uniformly mixed based on a weight ratio of 1:150, so as to prepare high-quality artificial soil.

In the third step, initially covering the surface of the slag mountain with a layer of artificial earth particles with a thickness of 600 mm, and compacting the artificial earth particles layer to insulate air and prevent spontaneous combustion; then covering a layer of high quality artificial soil with a thickness of 150 mm, Table 1 shows the content of heavy metals measured according to the method stipulated in GB15618-1995 Soil Environmental Quality Standard. The soil is then planted with flowers, grass and trees, the plants are elaborately maintained to form a green cover.

Example 2

In the first step, while the slag is added into the cone crusher for pulverization, 0.1 wt. % of potassium humate corresponding to the slag and a small amount of water are added, then pulverizing to obtain artificial earth particles having a particle diameter less than 0.5 mm. In addition, while the slag is pulverized, the mixing of the pulverized slag and the potassium humate is intensified so as to form a water-stable granular structure having a particle diameter more than 0.25 mm.

In the second step, the slag bacterial fertilizer and the above-mentioned artificial earth particles are uniformly mixed based on a weight ratio of 1:300, so as to prepare high-quality artificial soil.

In the third step, initially covering the surface of the slag mountain with a layer of artificial earth particles with a thickness of 2,000 mm, and compacting the artificial earth particles layer to insulate air and prevent spontaneous combustion; then covering a layer of high quality artificial soil with a thickness of 100 mm, Table 1 shows the content of heavy metals measured according to the method stipulated in GB15618-1995 Soil Environmental Quality Standard. The soil is then planted with flowers, grass and trees, the plants are elaborately maintained to form a green cover.

Example 3

In the first step, while the slag is added into the cone crusher for pulverization, 5 wt. % of sodium humate corresponding to the slag and a small amount of water are added, then pulverizing to obtain artificial earth particles having a particle diameter less than 0.5 mm. In addition, while the slag is pulverized, the mixing of the pulverized slag and the sodium humate is intensified so as to form a water-stable granular structure having a particle diameter more than 0.25 mm.

In the second step, the semi-coke bacterial fertilizer and the above-mentioned artificial earth particles are uniformly mixed based on a weight ratio of 1:100, so as to prepare high-quality artificial soil.

In the third step, initially covering the surface of the slag mountain with a layer of artificial earth particles with a thickness of 100 mm, and compacting the artificial earth particles layer to insulate air and prevent spontaneous combustion; then covering a layer of high quality artificial soil with a thickness of 200 mm, Table 1 shows the content of heavy metals measured according to the method stipulated in GB15618-1995 Soil Environmental Quality Standard. The soil is then planted with flowers, grass and trees, the plants are elaborately maintained to form a green cover.

Comparative Example 1

The renovation and afforestation of slag mountain are performed with humic acid substance according to the method in Example 1, the difference resides in that sodium humate is not added in the first step.

Table 1 shows the content of heavy metals measured according to the method stipulated in GB15618-1995 Soil Environmental Quality Standard.

Comparative Example 2

The renovation and afforestation of slag mountain are performed with humic acid substance according to the method in Example 1, the difference resides in that the semi-coke bacterial fertilizer is not added in the second step.

Table 1 shows the content of heavy metals measured according to the method stipulated in GB15618-1995 Soil Environmental Quality Standard.

Comparative Example 3

The renovation and afforestation of slag mountain are performed with humic acid substance according to the method in Example 1, the difference resides in that the semi-coke bacterial fertilizer is added in the first step along with the sodium humate.

Table 1 shows the content of heavy metals measured according to the method stipulated in GB15618-1995 Soil Environmental Quality Standard.

Comparative Example 4

The renovation and afforestation of slag mountain are performed with humic acid substance according to the method in Example 1, the difference resides in that the semi-coke bacterial fertilizer and the above-mentioned artificial earth particles are uniformly mixed based a weight ratio of 1:10.

Table 1 shows the content of heavy metals measured according to the method stipulated in GB15618-1995 Soil Environmental Quality Standard.

Comparative Example 5

The renovation and afforestation of slag mountain are performed with humic acid substance according to the method in Example 1, the difference resides in that the semi-coke bacterial fertilizer and the above-mentioned artificial earth particles are uniformly mixed based a weight ratio of 1:400.

Table 1 shows the content of heavy metals measured according to the method stipulated in GB15618-1995 Soil Environmental Quality Standard.

TABLE 1

| Heavy metals | Examples | | | Comparative Examples | | | | |
| --- | --- | --- | --- | --- | --- | --- | --- | --- |
|  | 1 | 2 | 3 | 1 | 2 | 3 | 4 | 5 |
| Fe mg/Kg | 10 | 5 | 8 | 300 | 100 | 20 | 24 | 10 |
| Cd mg/Kg | ND | ND | ND | 5 | 3 | ND | ND | ND |
| $Cr^{+6}$ mg/Kg | ND | ND | ND | 4 | 2 | ND | ND | ND |
| Pb mg/Kg | ND | ND | ND | 50 | 20 | ND | ND | ND |
| Hg mg/Kg | ND | ND | ND | 1 | ND | ND | ND | ND |
| As mg/Kg | ND | ND | ND | 20 | ND | ND | ND | ND |

Note:
ND = not detected

The invention claimed is:

1. A method of renovating and afforesting a slag mountain with a humic acid substance, the method comprising:
   1) preparing an artificial earth having a particle diameter less than 0.5 mm by pulverizing slag from the slag mountain and adding 0.1-5 wt. %, with respect to the slag, of the humic acid substance to the slag during pulverizing;
   2) preparing an artificial soil by adding a carrier bacterial fertilizer into the artificial earth according to a mixing ratio of 1:20-300 by weight of the carrier bacterial fertilizer to the artificial earth, wherein the carrier bacterial fertilizer is semi-coke bacterial fertilizer or slag bacterial fertilizer;
   3) covering the surface of the slag mountain with the artificial earth to form an artificial earth layer with a thickness of 100-2,000 mm and compacting the artificial earth layer, and then covering the artificial earth layer with the artificial soil to form an artificial soil layer having a thickness of 100-300 mm; and
   4) subsequently afforesting the slag mountain.

2. The method of renovating and afforesting a slag mountain with a humic acid substance according to claim 1, wherein the humic acid substance is one or more selected from the group consisting of humic acid, potassium humate, sodium humate, and biomass pyrolysis oil.

3. The method of renovating and afforesting a slag mountain with a humic acid substance according to claim 1, wherein the slag is pulverized with a pulverizer, the pulverizer is one selected from the group consisting of a ball mill, a cone crusher a baffle crusher, an impact crusher, a hammer crusher, a rotary crusher, a composite crusher, a hydraulic crusher, a deep cavity crusher, a roll crusher, a and a jaw crusher.

4. The method of renovating and afforesting a slag mountain with a humic acid substance according to claim 3, wherein the cone crusher is selected from the group consisting of a Symons cone crusher and a hydraulic cone crusher.

5. The method of renovating and afforesting a slag mountain with a humic acid substance according to claim 3, wherein the roll crusher is a toothed roller crusher.

6. The method of renovating and afforesting a slag mountain with a humic acid substance according to claim 1, wherein the semi-coke bacterial fertilizer or the slag fertilizer is obtained by uniformly loading a microbial bacterial fertilizer on a biological semi-coke powder or a gasifier slag to a level of 3-20% by weight of the microbial bacterial fertilizer with respect to the biological semi-coke powder or the gasifier slag, and drying;
   wherein the microbial bacterial fertilizer comprises microbial thallus or an active enzyme.

7. The method of renovating and afforesting a slag mountain with a humic acid substance according to claim 6, wherein the microbial thallus is from at least one selected from the group consisting of *Bacillus, Saccharomyces cerevisiae, Aspergillus oryzae, Rhizobium*, Azotobacteria and Phosphorus bacteria.

8. The method of renovating and afforesting a slag mountain with a humic acid substance according to claim 6, wherein the active enzyme is one or more enzyme selected from the group consisting of a protease and a plant kinase.

9. The method of renovating and afforesting a slag mountain with a humic acid substance according to claim 6, wherein the loading comprises: mixing microbial bacterial fertilizer solution and the biological semi-coke powder or the gasifier slag uniformly, to allow the microbial bacterial fertilizer loading on the biological semi-coke powder or the gasifier slag.

10. The method of renovating and afforesting a slag mountain with a humic acid substance according to claim 6, wherein the biological semi-coke powder has a particle diameter of 0.01-5 mm and is obtained by rapidly pyrolyzing agricultural and forest residues to prepare biological semi-coke, then pulverizing the biological semi-coke into the biological semi-coke powder.

11. The method of renovating and afforesting a slag mountain with a humic acid substance according to claim 10, wherein the rapidly pyrolyzing comprises: pyrolyzing the agricultural and forest residues in reaction conditions of absence of air at 490-600° C. for 0.1-20 s.

12. The method of renovating and afforesting a slag mountain with a humic acid substance according to claim 6, wherein the gasifier slag is a product formed by chilling a cinder generated when gasifying pulverized coal in an airflow bed at a temperature of 1,300° C. or more.

13. The method of renovating and afforesting a slag mountain with a humic acid substance according to claim 6, wherein prior to uniformly loading the microbial bacterial fertilizer on the biological semi-coke powder or the gasifier slag, the method further comprising: uniformly mixing 0.1-2 parts by weight of humectant with 100 parts by weight of the biological semi-coke powder or the gasifier slag, so as to prepare an modified biological semi-coke powder or an modified gasifier slag;

wherein the humectant is selected from the group consisting of an anionic surfactant, a nonionic surfactant, a silanol nonionic surfactant, and a solvent which has a small surface tension and is miscible with water.

14. The method of renovating and afforesting a slag mountain with a humic acid substance according to claim 13, wherein the solvent is one or more selected from the group consisting of ethanol, propylene glycol, glycerin and dimethyl sulfoxide.

\* \* \* \* \*

UNITED STATES PATENT AND TRADEMARK OFFICE
CERTIFICATE OF CORRECTION

PATENT NO. : 10,493,507 B1
APPLICATION NO. : 16/293182
DATED : December 3, 2019
INVENTOR(S) : Yingyun Qiao et al.

Page 1 of 1

It is certified that error appears in the above-identified patent and that said Letters Patent is hereby corrected as shown below:

In the Claims

In Claim 3, at Column 8, Line 13, insert a --,-- after the term "cone crusher".

In Claim 3, at Column 8, Line 15, after "...a roll crusher,", delete the word "a".

Signed and Sealed this
Eighteenth Day of February, 2020

Andrei Iancu
*Director of the United States Patent and Trademark Office*